United States Patent [19]
Quirk et al.

[11] Patent Number: 4,942,776
[45] Date of Patent: Jul. 24, 1990

[54] NON-METALLIC GEAR SHAKER

[75] Inventors: Michael J. Quirk; Timothy E. Drake, both of Westfield, N.Y.; John E. Zarycki, North East, Pa.

[73] Assignee: Renold, Inc., Westfield, N.Y.

[21] Appl. No.: 339,226

[22] Filed: Apr. 17, 1989

[51] Int. Cl.$^5$ .......................... F16H 33/20; B06B 1/16
[52] U.S. Cl. .................................. 74/61; 74/DIG. 10; 366/128
[58] Field of Search .......................... 74/61, DIG. 10; 366/128; 209/367

[56] References Cited

U.S. PATENT DOCUMENTS

| | | | |
|---|---|---|---|
| 1,517,587 | 12/1924 | Roth | 366/128 X |
| 1,999,213 | 4/1935 | Shaler | 366/128 X |
| 2,144,382 | 1/1939 | Lincoln et al. | 209/367 X |
| 2,839,943 | 6/1958 | Caldwell et al. | 74/DIG. 10 X |
| 2,897,734 | 8/1959 | Bodine, Jr. | 74/61 X |
| 3,417,966 | 12/1968 | Bodine | 366/128 X |
| 3,630,357 | 12/1971 | Nolte | 209/367 X |
| 3,640,508 | 2/1972 | Reibig | 366/128 X |
| 4,784,088 | 11/1988 | Tamba et al. | 74/DIG. 10 X |
| 4,793,196 | 12/1988 | Davis et al. | 74/61 |

FOREIGN PATENT DOCUMENTS

| | | | |
|---|---|---|---|
| 2021685 | 11/1971 | Fed. Rep. of Germany | 74/DIG. 10 |
| 7708864 | 6/1978 | Netherlands | 74/DIG. 10 |

Primary Examiner—Allan D. Herrmann
Attorney, Agent, or Firm—Charles L. Lovercheck; Wayne L. Lovercheck; Dale R. Lovercheck

[57] ABSTRACT

Applicant has discovered that the use of plastic gears in connection with metal gears on a main gear reduces the amount of friction between gear teeth and in addition reduces noise resulting from the assembly. Applicant's shaker herein requires a minimal amount of maintenance and will operate for long periods of time. Moreover, Applicant's shaker requires little or no lubrication. The gears may be disposed between the two parts of the housing and the eccentric weights outside the housing or visa versa.

6 Claims, 2 Drawing Sheets

NON-METALLIC GEAR SHAKER

BACKGROUND OF THE INVENTION

The present invention relates to gear coupled counter rotating shakers for generating linear vibratory motion.

Shakers or vibrators have been known for many years. However, such shakers have various limitations and disadvantages. Various types of counter rotating rotary shakers have been suggested throughout the years, however most of these shakers have substantial maintenance and reliability problems. Noise of the gears in rotary shakers is also a significant problem.

GENERAL STATEMENT OF THE INVENTION

In the shaker of the present invention, eccentric weights are driven by gears familiar to those skilled in the art. The gears may have plastic tooth sections and metal hubs. The bearings are of the low friction type supported on the housing in bearing retainers. The shafts are made with shoulders that engage the bearings and trap the bearings between the shoulders and the bearing retainer rings holding the shafts against axial sliding and therefore simplifying the construction of the device.

In order to eliminate noise and wear, either the drive gear, the driven gear or both may be provided with plastic teeth and a metal hub that is coupled to the drive shaft through a key way or other suitable means familiar to those skilled in the art.

The gears may preferably be a plastic gear ring formed of nylon material or other suitable plastic that requires very little if any lubrication and has high tensil strength. Preferably the nylon is lubricated by a suitable anti-friction material to minimize the friction between plastic gear teeth which are self lubricating. Applicant's cover serves as a guard for the weights whereas the prior art has guards as separate items. Applicant's bearing are sealed, lubricated for life and no shim adjustment is required.

OBJECTS OF THE INVENTION

It is an object of the invention is to provide a gear coupled counter rotary vibrator wherein noise of the gears is significantly reduced and wear and maintenance problems are likewise reduced.

Another object of the invention is to provide a gear coupled counter rotary shaker that is simple in construction, economical to manufacture and simple and efficient to use.

Another object of the invention is to provide an improved gear and shaft support in a shaker wherein the weights of the shaker balance out any couple or moment that might occur in connection with the weights.

Another object of the invention is to provide an improved bearing and shaft support in a shaker.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DETAILED DESCRIPTION OF THE DRAWINGS

Figure 1:
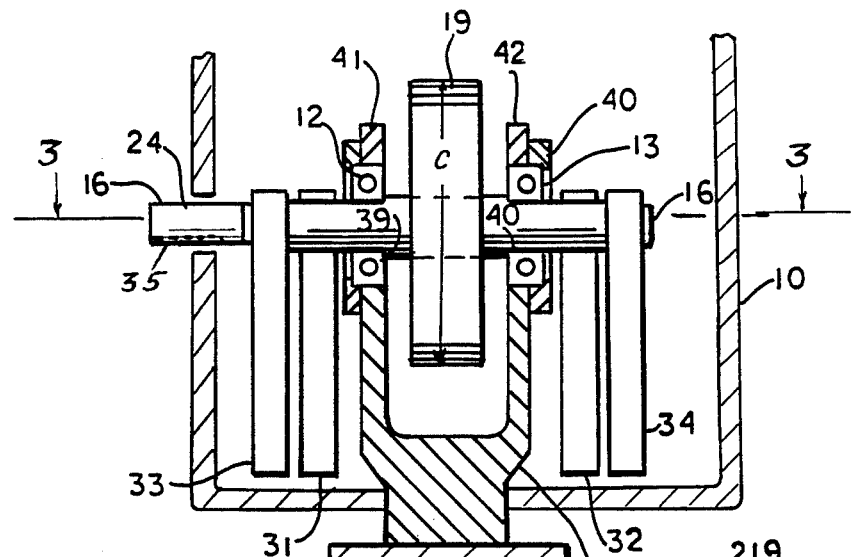
FIG. 1 is a cross-sectional view taken on line 1—1 of FIG. 3.
Figure 3:
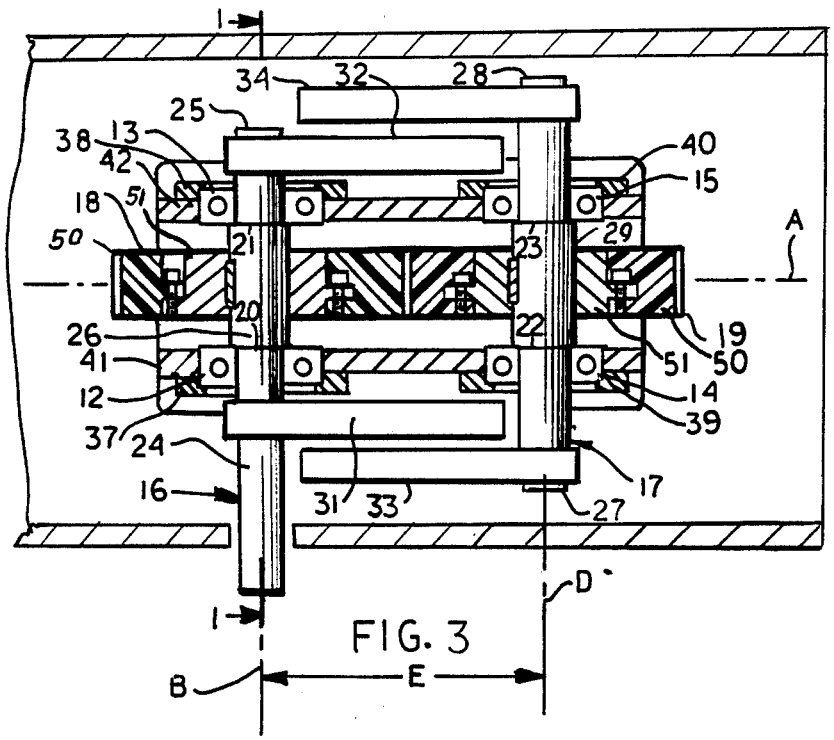
FIG. 3 is a horizontal cross sectional view taken on line 3—3 of FIG. 1.
Figure 4:
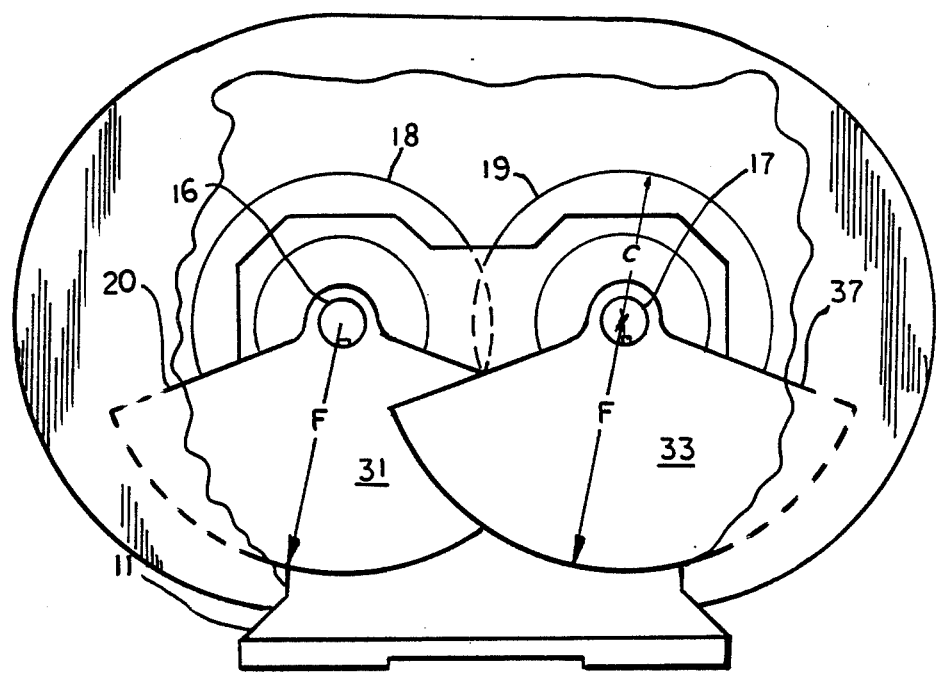
FIG. 4 is a side view of the embodiment of the invention shown in FIG. 1, with the cover partly broken away.

Now with more particular reference to the drawings, in FIGS. 1, 3 and 4, a gear coupled counter rotary shaker is shown comprising cover 10, gear box or housing 11, having a central axis A, first bearing 12, second bearing 13, third bearing 14, fourth bearing 15 and input shaft 16. Input shaft 16 has axis B and a keyway comprising input means 35 for connecting a motor or other drive thereto. First bearing 12 and second bearing 13 receive input shaft 16. Third bearing 14 and fourth bearing 15 receive output shaft 17. First bearing retainer 37 receives first bearing 12, second bearing retainer 38 receives second bearing 13, third bearing retainer 39 receives third bearing 14 and fourth bearing retainer 40 receives fourth bearing 15. The bearing retainers are attached to housing 11 and hold the bearings against outward movement.

Housing 11 has first side part 41 and second side part 42. First side part 41 has spaced openings which receive first bearing 12 and second bearing 13 respectively. Second side part 42 has spaced holes that receive third bearing 14 and fourth bearing 15 respectively. Cover 10 is fixed to housing 11 below sides 41 and 42 by any suitable well-known fastening means familiar to those skilled in the art.

Input shaft 16 has enlarged intermediate, or central, part 26 which joins reduced size first end part 24 and reduced size second end part 25 at first shoulder 20 and second shoulder 21. First end part 24, of input shaft 16, and second end part 25, of input shaft 16, receive first bearing 12, second bearing 13, first shoulder 20 and second shoulder 21 thereby limiting the axial inward movement of first bearing 12 and second bearing 13.

Output shaft 17 has first end 27, second end 28, enlarged intermediate part 29, with output gear 19, having radius C, supported on and keyed to enlarged intermediate part 29. Enlarged intermediate part 29 is joined to first end 27, of output shaft 17 and second end 28 at third shoulder 22 and fourth shoulder 23 respectively. First end part 27, of output shaft 17 and second end part 28 receive third bearing 14 and fourth bearing 15, third shoulder 22 and fourth shoulder 23, thereby limiting the axial inward movement of third bearing 14 and fourth bearing 15. Output shaft 17 and output gear 19 are spaced a distance E from one another.

First eccentric weight 31 and third eccentric weight 33 have radius F from the centers of input shaft 16 and output shaft 17. First eccentric weight 31 is supported on first end 24 of input shaft 16 and second eccentric weight 32 is supported on second end 25 of input shaft 16. Third eccentric weight 33 is supported on first end 27 of output shaft 17 and fourth eccentric weight 34 is supported on second end 28 of output shaft 17. Input gear 18 and output gear 19 each have plastic outer sections 50 and metal hub sections 51. This type of gear operates much quieter and with less vibration than all metal gears and metal hub sections 51 will withstand much greater stress and wear than a gear made of all plastic.

First eccentric weight 31 and second eccentric weight 32 are mounted axially offset with respect to third eccentric weight 33 and fourth eccentric weight 34 so that the eccentric weights rotate in noninterfering paths. Either input gear 18 or output gear 19 could have metal teeth or either could have a metal hub with plastic teeth engaging metal teeth of the other gear, or both gears could have plastic teeth, as shown in FIG. 3.

Figure 2:
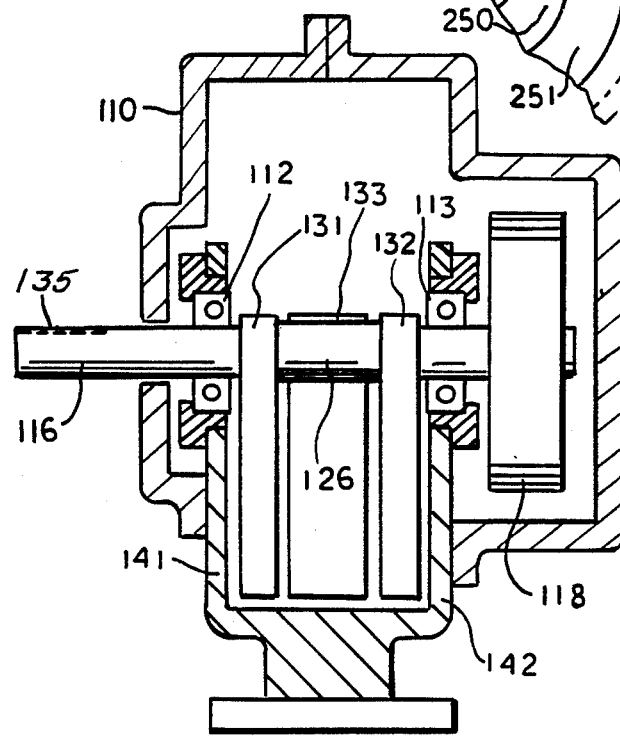
FIG. 2 is a cross-sectional view similar to FIG. 1 of another embodiment of the invention.

The shaker shown in the embodiment of FIG. 2 is like the embodiment of FIG. 1 except first eccentric weight 131 and second eccentric weight 132 are keyed to the intermediate parts respectively of input shaft 116. Third eccentric weight 133 is keyed to output shaft 117 and disposed between housing first side parts 141 and housing second side part 142. Input gear 118 is keyed to the outer end of input shaft 116. An output gear may be keyed to an outer end of an output shaft. Cover 110 is fixed to housing 111 below sides 141 and 142 by a suitable fastening means familiar to those skilled in the art.

The shaker shown herein can be described as a gear coupled, counter rotating vibratory drive assembly comprising a housing 11 for operatively connecting to a device to be vibrated in a desired linear motion. Housing 11 has a prescribed length with an elongaged central gear box compartment formed therein.

Drive shaft 16 extends through the gear box compartment of housing 11 and is rotatably supported by drive shaft support bearings 12 and 13 for rotation about drive shaft axis B. Drive shaft 16 has central gear section 26 intermediate drive shaft support bearings 12 and 13 and end sections 24 and 25 extending outward from central gear section 26 and drive shaft support bearings 12 and 13 exterior of the gear box compartment of housing 11.

Drive gear 18, having prescribed diameter C, is mounted on central gear section 26 for rotation with drive shaft 16 within the gear box compartment of housing 11.

Driven shaft 17 extends through the gear box compartment of housing 11 and rotatably supported by driven shaft support bearings 14 and 15 for rotation about driven shaft axis D that is parallel with drive shaft axis B. Driven shaft 17 has central gear section 29 intermediate driven shaft support bearings 14 and 15 and the end sections extending outward from central gear section 29 and driven shaft support bearings 14 and 15 are exterior of said gear box compartment of housing 11.

Driven gear 19 is mounted on central gear section 29 intermeshed with drive gear 18 for rotating driven shaft 19 at the same angular speed but in a direction counter to drive shaft 16.

Eccentric weights 31, 32, 33 and 34 are mounted on the end sections of both drive shaft 16 and said driven shaft 17 for rotation therewith in counter-rotating directions about said shaft axes B and D in phased angular relationship to generate vibrational linear motion. Each of the eccentric weights 31, 32, 33 and 34 have prescribed peripheral radius F from respective shaft axes B and D that is less than the prescribed diameter of drive gear 18 but greater than one-half the prescribed diameter of driven gear 19 wherein eccentric weights 31 and 32 on drive shaft 16 are mounted axially offset with respect to eccentric weights 33 and 34 on driven shaft 17 so that the eccentric weights rotate in noninterfering paths.

Figure 5:
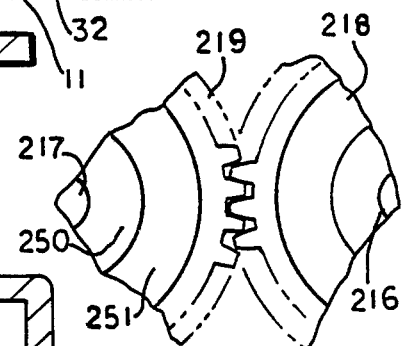
FIG. 5 is a partial view of parts of another embodiment of the invention showing one gear having metal teeth and another gear having plastic teeth.

In the embodiment of FIG. 5, driven gear 219, mounted on driven shaft 217, has metal hub 250 with plastic gear tooth ring 251 mounted on hub 250 in which plastic gear tooth ring 251 has plastic teeth engaging the metal teeth of drive gear 218, which is mounted on drive shaft 216. The gears of FIG. 1 are shown with both gears having plastic teeth but obviously either one gear or the other could have metal teeth.

Housing 11 has central housing axis A normal to shaft axes B and D. The eccentric weights on each shaft are equally spaced from central housing axis A. Eccentric weights 33 and 34 on driven shaft 17 are mounted axially offset outward of eccentric weights 31 and 32 on drive shaft 16. Each of the eccentric weights may be removed and replaced from an end section without removing or replacing a shaft support bearing, in the embodiment of FIGS. 1, 3 and 4. The eccentric weights are identically shaped and have the same weight. Each of the eccentric weights has a hub section and an enlarged eccentric support section extending from the hub section to a periphery. Each of the radius sections of the eccentric weights has a constant thickness from said sections to the periphery.

Plastic gear teeth 50 may be formed of a nylon plastic material or other material having similar properties.

The counter-rotating vibratory drive assembly further comprises guards or covers 10 detachably mounted to housing 11. Each guard or cover 10 has a major dimension greater than the length of housing 11 with guards or covers 10 extending beyond housing 11 to fully encircle the eccentric weights.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A gear coupled counter rotating shaker comprising a housing,
   said housing having a first side part and a second side part,
   an input gear on said second end of said input shaft,
   a third eccentric weight on said intermediate part of said output shaft,
   said third eccentric weight being disposed between said first eccentric weight and said second eccentric weight,
   an output gear on said second end of said output shaft engaging said input gear,
   said third bearing being disposed on said housing adjacent said third eccentric weight,
   said fourth bearing being disposed on said output shaft between said third eccentric weight and said output gear,
   a one piece input shaft and a one piece output shaft,
   said input shaft being received in said first bearing and said second bearing,
   said output shaft being supported in said third bearing and said fourth bearing,
   a first eccentric weight and a second eccentric weight, said input shaft having a first end, a second end and an intermediate part, said output shaft having a first end, a second end and an intermediate part, said first eccentric weight being supported on said intermediate part of said input shaft, said second eccentric weight being supported on said intermediate part of said input shaft, said first eccentric weight and said second eccentric weight are disposed between said first side part of said housing and said second side part of said housing.

2. The shaker recited in claim 1 wherein a cover is disposed over said shaker, said cover enclosing said shafts, said weights, said housing and said gears, said cover extending downwardly below said weights and being fixed to said sides of said housing.

3. The shaker recited in claim 1 wherein said shaker has a cover extending over said weights, said gears and said sides and said cover being attached to said sides.

4. The shaker recited in claim 1 wherein one of said gears has a metal hub with a plastic gear ring mounted on said hub in which said plastic gear ring has plastic teeth engaging said metal teeth of the one gear.

5. The shaker recited in claim 1 wherein one of said drive gear and said driven gear has teeth made of a plastic material.

6. The shaker as defined in claim 5 wherein said plastic gear teeth are formed of nylon.

* * * * *